US008043552B2

(12) United States Patent
Outreman

(10) Patent No.: US 8,043,552 B2
(45) Date of Patent: *Oct. 25, 2011

(54) METHOD FOR PRODUCING A THIN-WALLED CONTAINER AND CONTAINER PRESSURISATION METHOD

(75) Inventor: Jean-Tristan Outreman, Saint Maximin la Sainte Baume (FR)

(73) Assignee: Tecsor HR (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/681,931

(22) PCT Filed: Oct. 9, 2008

(86) PCT No.: PCT/FR2008/051826
§ 371 (c)(1),
(2), (4) Date: Apr. 7, 2010

(87) PCT Pub. No.: WO2009/053616
PCT Pub. Date: Apr. 30, 2009

(65) Prior Publication Data
US 2010/0237546 A1    Sep. 23, 2010

(30) Foreign Application Priority Data
Oct. 10, 2007   (FR) .................................... 07 58185

(51) Int. Cl.
*B29C 49/64* (2006.01)
(52) U.S. Cl. ...................................... 264/524; 264/525
(58) Field of Classification Search .................. None
See application file for complete search history.

(56) References Cited

U.S. PATENT DOCUMENTS

| | | | |
|---|---|---|---|
| 4,040,233 A | 8/1977 | Valyi | |
| 4,318,882 A * | 3/1982 | Agrawal et al. | 264/521 |
| 4,356,681 A * | 11/1982 | Barnes | 53/440 |
| 4,863,046 A | 9/1989 | Collette et al. | |
| 5,090,180 A | 2/1992 | Sorensen | |
| 5,281,387 A | 1/1994 | Collette et al. | |
| 5,419,866 A | 5/1995 | Valyi | |
| 5,540,879 A | 7/1996 | Orimoto et al. | |
| 5,614,148 A * | 3/1997 | Beck et al. | 264/532 |
| 5,673,808 A | 10/1997 | Valyi | |
| 5,735,420 A | 4/1998 | Nakamaki et al. | |
| 5,884,792 A | 3/1999 | Krishnakumar et al. | |
| 6,062,408 A | 5/2000 | Beck et al. | |
| 6,502,369 B1 | 1/2003 | Andison et al. | |
| 6,568,156 B2 | 5/2003 | Silvers et al. | |
| 2002/0004090 A1 | 1/2002 | Lafleur | |
| 2002/0020149 A1 | 2/2002 | Silvers et al. | |
| 2003/0110736 A1 | 6/2003 | Boyd | |
| 2004/0131735 A1 | 7/2004 | Korengel et al. | |
| 2005/0121408 A1 | 6/2005 | Deemer et al. | |
| 2007/0090083 A1 | 4/2007 | Trude | |
| 2010/0018166 A1 | 1/2010 | Outreman | |

FOREIGN PATENT DOCUMENTS

| | | |
|---|---|---|
| DE | 195 20 925 A1 | 12/1996 |
| EP | 1 468 930 | 10/2004 |
| EP | 1 527 999 | 5/2005 |
| FR | 2 772 365 | 6/1999 |
| FR | 2 887 238 | 12/2006 |
| WO | 03/033361 | 4/2003 |
| WO | 2006/039523 | 4/2006 |

OTHER PUBLICATIONS

International Search Report dated Mar. 31, 2009, from corresponding PCT application.

* cited by examiner

*Primary Examiner* — Monica A Huson
(74) *Attorney, Agent, or Firm* — Mario A. Tabone; Plastipak Packaging, Inc.

(57) ABSTRACT

A process for pressurization of a thin-walled plastic container having a container weight to wall surface ratio on the order of 150 g/m² to 250 g/m², designed to contain a flat liquid, comprising the following stages: providing a container; filling the container that has residual stresses under cold conditions with said flat liquid; sealing the container after filling; and, heating the container, without raising the temperature of the liquid, to reach the temperature of the container's glass transition point so as to generate a pressurization of the interior of said container.

4 Claims, No Drawings

METHOD FOR PRODUCING A THIN-WALLED CONTAINER AND CONTAINER PRESSURISATION METHOD

This invention relates to a process for manufacturing a thin-walled container and the process for pressurizing this full container.

In the farm produce industry, in particular that of beverages, the high-volume, thin-walled containers are a particular problem.

The thin-walled containers are known in, for example, the patent applications WO-03/033361, EP-1468930 and EP-1527999.

These containers are very attractive for small volumes of less than 2 liters, because beyond this, the products that are produced according to the teaching of these patents are relatively heavy because the amount of material is linked to the parameter of the volume of these containers.

The increase of the surface area of a package is not proportional to that of the volume of said package. Therefore, for volumes of more than 2 liters, it is entirely possible to reduce the weight of the packages while ensuring good mechanical stability after packaging.

In addition, these containers exhibit the necessity for a pressurization of the inner volume that is not satisfactory as explained below.

In addition, for economic reasons that are easily understood, the object is to reduce the amount of material that is necessary for the production of these thin-walled containers, as much for reducing the production costs as for reducing the recycling costs, which the prior art does not allow since as soon as the volumes become greater than 2 liters, in particular, the weight of the material increases very significantly since it is linked to the volume, therefore a cubic factor.

These containers are disposable, and it would be advantageous to avoid unnecessary sophistication for the use to which they are put, hence the increased importance of the thin-walled containers but with an identical manufacturing process that allows a range going from small containers of several centiliters up to high volumes of one to several tens of liters by avoiding an excessive increase of the weight of the material.

In addition to the problem of reducing the amount of material, it is possible to mention another problem, that of rigidity, which proportionally decreases with the amount of material.

For these containers that are manufactured by the process according to the invention, with a reduced amount of material, the rigidity of the container that is obtained is inadequate.

This rigidity is inadequate for allowing good gripping before opening, and primarily this low rigidity makes difficult, and even impossible, a superposition of these full containers, in particular when they are palletized and the pallets are stacked on one another.

In addition, the rigidity of such a thin-walled container poses another problem because these containers are packaged at ambient temperature and when these containers are placed in a cold environment, a collapsing phenomenon occurs that produces deformations of the container and poor stability during gripping.

In general, the thin-walled containers are filled under cold conditions with flat liquids such as mineral water, oil, fruit juices, or milk.

Then, to meet the requirement of rigidity, it is provided to put these thin-walled containers under internal pressure by resorting in particular to the so-called nitrogen drop process that is currently used industrially or to any other analogous process.

This nitrogen drop process that is taken as an example consists in introducing a drop of liquid nitrogen into the liquid-filled container to be packaged immediately before the head space of the container is sealed.

Immediately after sealing, this drop of liquid nitrogen is transformed into gas. The increase in volume in the head space leads to a rise in pressure in the interior of the container and therefore to a rigidification of said container. This increase in pressure nevertheless remains relatively low on the order of one-tenth of a bar.

However, this process of the drop of nitrogen poses a certain number of problems.

First of all, the metering of the volume that is introduced is difficult; however, the final pressure depends on the amount that is introduced, working conditions, and the length of time of sealing.

Then, the distribution means of this drop of nitrogen should be integrated in the chain, and, as a result, they should therefore be adapted. In addition, when the packaging is produced aseptically, this adaptation is a high stress: requirements of cleaning, sterilization, and maintenance. An additional station involves an additional source of failure with the stopping of a chain. In the case of an aseptic packaging chain, this intervention proves still more difficult because the interventions are difficult and time-consuming since it is necessary to restore the unit to aseptic packaging conditions.

In addition, it is noted that the liquid nitrogen, at a greatly negative temperature, drops in the liquid to ambient temperature although the fall of the drop uniformly causes splashing on the edges of the container.

These splashes of the contained fluid, such as mineral water, fruit juice, and oil, can degrade after packaging, during the storage, leading to the development of mold before the product is marketed and therefore before the product is consumed, which is not satisfactory.

The material that is used for manufacturing the thin-walled containers is often PET, polyethylene terephthalate, known for its transparency, its low weight, and its great shaping possibilities. The PET also allows good preservation of contained liquids.

This invention proposes a process for manufacturing a thin-walled container as well as a process for pressurizing said container that is filled under cold conditions and that contains a flat liquid so as to increase the rigidity of said container before opening, a process that compensates for the problems that are mentioned above.

According to the invention, the process for manufacturing a thin-walled container consists in producing said thin-walled container with a material weight/wall surface ratio on the order of 150 g/m² to 250 g/m², and even 150 g/m² to 200 g/m².

The collar weight of the package is excluded from this ratio. The collar of the package is defined by the material that does not undergo any deformation during the manufacturing of said package.

In this case, the thin-walled container is of the type that is manufactured in a known way by a longitudinal and radial blowing process starting from a preformed shape.

This container has the necessary and desired volume, and it is manufactured from PET.

In contrast, residual manufacturing stresses remain. Actually, in the case of PET, in particular, once the preformed shape is blown, the container is cooled very quickly in the molds. The shape that is obtained and the stresses that are linked to the deformation are created by this lowering of temperature.

Actually, during the blowing process, the stresses are exerted in two directions, longitudinal and radial, hence the name of bi-oriented PET container given to the containers that are thus obtained.

This setting at a temperature that is below the glass transition temperature is what ensures that the container retains its shape.

The process for pressurization, according to this invention, of a thin-walled container that is obtained according to the preceding process, designed to contain a flat liquid, consists of the series of the following stages:

Production of a container according to the preceding process,

Filling the thin-walled container, which has residual stresses, under cold conditions with said flat liquid, Sealing the container after filling, and Heating the wall of the container, without raising the temperature of the liquid, to reach the temperature point for release of said residual stresses so as to generate a reduction of volume of the container and therefore a pressurization of said container.

The purpose of this last so-called heating stage of the wall is to heat only the wall taken in its thickness. This heat input causes the release of stresses that had been created by the rapid cooling after deformation during manufacturing.

In the case of a blown PET container, the residual stresses are bi-oriented. The container therefore has a tendency to resume its initial shape, i.e., that of the preformed shape.

Because of this tendency toward a volumetric reduction, the interior of the container is pressurized and since the liquid is incompressible, the head space is compressed until a balance is reached between the pressure exerted by the wall and the inner pressure.

The thus generated inner pressure remains less than 1 bar, but this pressure is absolutely adequate for considerably increasing the rigidity of the filled and sealed container before its first sealing.

Such heating can be implemented by means of spraying hot air on the periphery of the container for a short period of time. It is advisable to reach the temperature point that causes the release of the stresses in the material, a point known also under the name of glass transition point.

The heat energy input should be significant over a very short period.

Thus, the PET, which is a poor conductor of heat, absorbs calories supplied by hot air, which leads to a rapid release of the stresses and prevents the transmission of calories to the liquid or at least makes the amount of transmitted calories totally negligible.

Actually, in the case of heating and a temperature rise of the liquid mass that is contained, it is known that this causes, in cooling, a reduction of the volume of the head space that is reflected by a collapse of the bottle. Actually, the inner pressure decreases while the container has seen its volume created, since the release of the stresses is also created with the lowering of the temperature below the glass transition point.

The inner pressurization according to the process of this invention also makes it possible to compensate for the reduction in pressure, low but able to exist, linked to the loss of a portion of the liquid because of the permeability of the walls, these walls being very thin.

The pressurization of the interior of the container also makes it possible to compensate for the collapse that is linked to a temperature decrease between the packaging temperature and the storage temperature, before opening.

The thus used process is extremely industrializable with very limited costs, very small breakdown risks, and an absolutely satisfactory reproducibility since it is self-regulated.

Primarily, the rigidification processing by heat is conducted outside of the chain, namely when the container is sealed, which is a considerable gain by eliminating an operation inside the aseptic chamber when the packaging is produced by aseptic means.

The thin-walled containers that are thus produced, having wall thicknesses such that the material weight/surface ratio is between 150 g/m$^2$ and 250 g/m$^2$, and more particularly 150 g/m$^2$ and 200 g/m$^2$, can withstand large loads because of their greatly increased rigidity; in particular, such containers can be palletized, and the pallets themselves can be stacked.

From the sanitary standpoint, it should also be noted that the guarantee of the preservation of qualities imparted to the liquid during bottling cannot be disputed since the heating operation is outside of the bottling chain and is implemented on a closed container. The advantage of this outside operation is measured when it is a matter of a chain working in an aseptic environment.

Even a possible contamination source is eliminated since the station that allows the pressurization of the interior of the container is withdrawn from the working zone in an aseptic environment.

The heating—of which it is indicated that a preferred embodiment is that of hot air—can also resort to any other type of heating that allows a rapid elevation of the temperature of the wall without significantly influencing the temperature of the contents, for example infra-red heating.

Likewise, the material in question is PET because it is currently the most used, but this invention relates to any suitable material for producing a container, able to exhibit residual stresses, obtained from deformation.

The invention claimed is:

1. A process for pressurization of a thin-walled plastic container having a container weight to wall surface ratio on the order of 150 g/m$^2$ to 250 g/m$^2$, designed to contain a flat liquid, comprising the following stages:

providing a container, filling the container that has residual stresses under cold conditions with said flat liquid, sealing the container after filling, and heating the container, without raising the temperature of the liquid, to reach the temperature of the container's glass transition point so as to generate a pressurization of the interior of said container.

2. A process for pressurization of a thin-walled plastic container according to claim 1, wherein the container has an internal pressure of 1 bar or less after the heating stage.

3. A process for pressurization of a thin-walled plastic container according to claim 1, wherein the container comprises polyethylene terephthalate (PET).

4. A process for pressurization of a thin-walled plastic container according to claim 1, wherein the container is bi-oriented.

* * * * *